July 3, 1934.                F. SMITH                1,965,476
HYDRAULIC THREE-WAY DUMPER
Filed April 4, 1932          3 Sheets-Sheet 1

INVENTOR.
FRANK SMITH.
BY
*Victor J. Evans & Co*
ATTORNEYS.

July 3, 1934.  F. SMITH  1,965,476
HYDRAULIC THREE-WAY DUMPER
Filed April 4, 1932  3 Sheets-Sheet 2
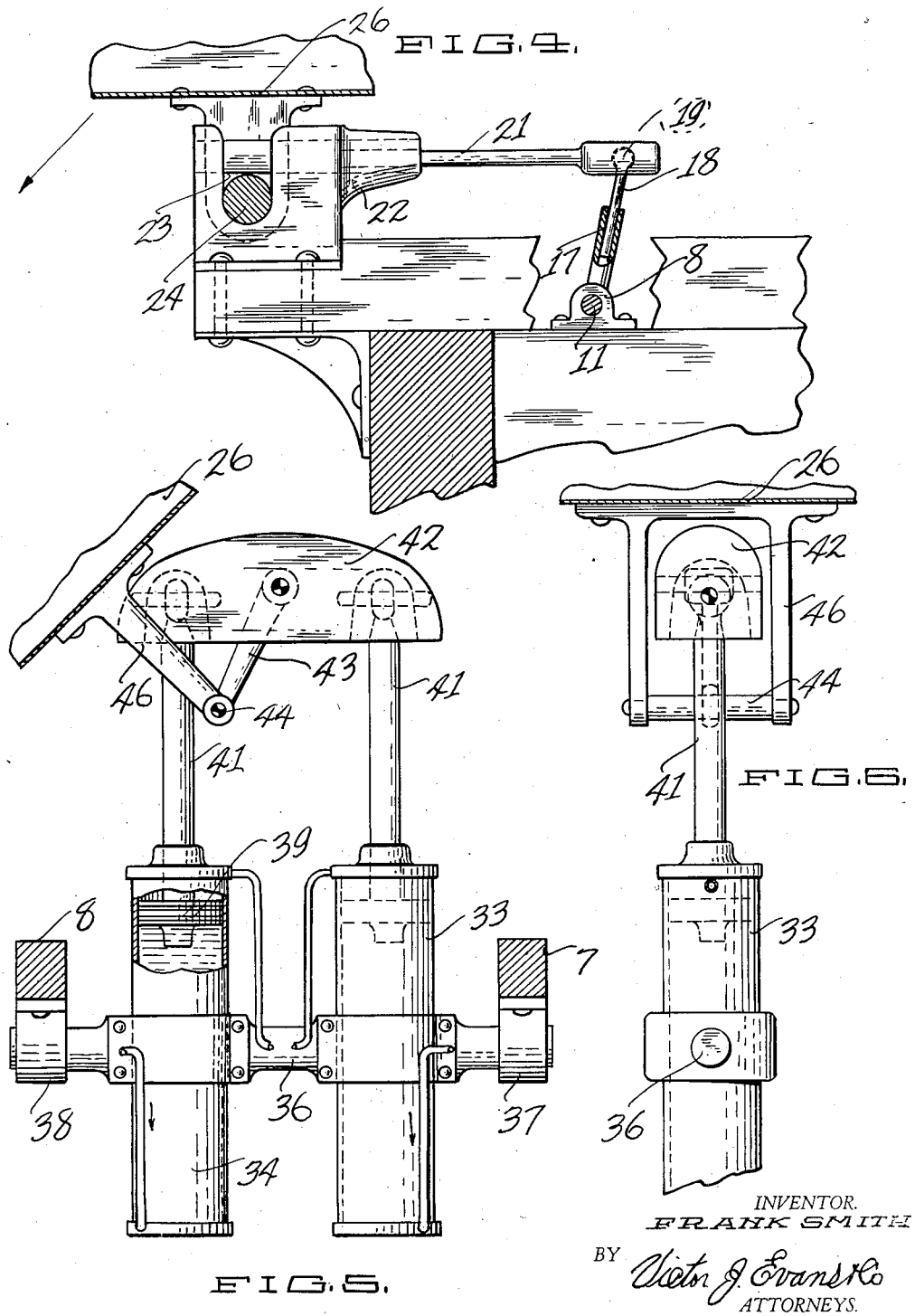
INVENTOR.
FRANK SMITH
BY Victor J. Evans & Co
ATTORNEYS.

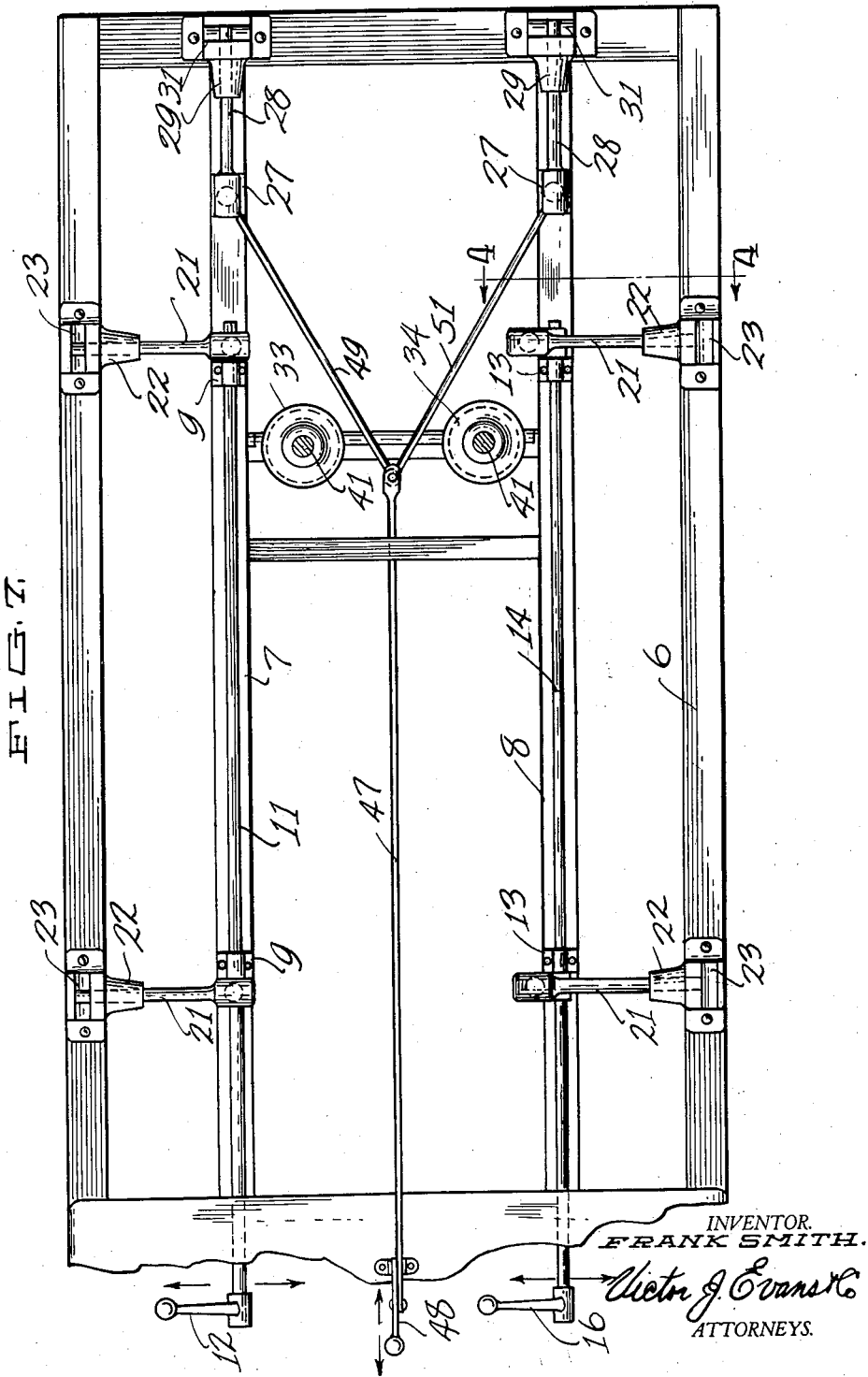

UNITED STATES PATENT OFFICE 1,965,476

HYDRAULIC THREE-WAY DUMPER

Frank Smith, Burlingame, Calif.

Application April 4, 1932, Serial No. 603,192

1 Claim. (Cl. 298—18)

This invention relates to improvements in trucks and has particular reference to a material holding dumping truck, the body of which is adapted to be raised by hydraulic means which cooperates with a remotely controlled tilting mechanism to thus realize a plurality of dumping operations.

The principal object of the invention is to provide a double hydraulic lift jack and unique operating mechanism capable of tipping the truck body either rearwardly or to either side.

A further object is to produce a device which is simple in construction, positive in operation and easy to operate.

A still further object is to produce a device of this character which is economical to manufacture, and one which may be applied to an ordinary dump truck without materially altering its construction.

A still further object is to produce a device which is sturdy in construction and which is capable of standing the hard usage incident to devices of this character.

Other objects and advantages will be apparent during the course of the following description.

In the accompanying drawings forming a part of this specification and in which like numerals are employed to designate like parts throughout the same, Figure 1 is a side elevation of a dump truck showing the body in rear dumping position, Figure 2 is a rear elevation of Fig. 1 showing the dump body in full lines, dumping to the left of the vehicle, and in dotted lines, the position of the body in dumping to the right of the vehicle, Figure 3 is a fragmentary detail view showing the bolt actuating mechanism, Figure 4 is an enlarged fragmentary detail view showing one of the bolts in locked position, Figure 5 is an enlarged fragmentary detail view showing the hydraulic jack mounting and connection to the body.

Figure 6 is a side elevation of Fig. 5, and

Figure 7 is a fragmentary top plan view of the body supporting frame.

Figure 1:
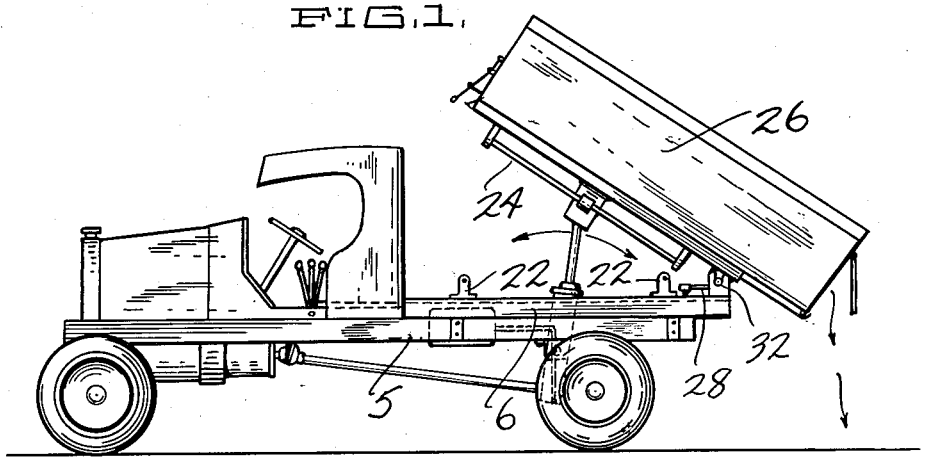

In the accompanying drawings wherein for the purpose of illustration is shown a preferred embodiment of my invention, the numeral 5 designates a motor vehicle of the dump truck type capable of supporting a dump body. At 6 I have shown a body supporting frame mounted originally upon the vehicle and having parallel members 7 and 8. The parallel member 7 supports bearings 9 in which a rock-shaft 11 is freely rotatable thru the medium of a handle 12. The parallel member 8 supports similar bearings 13 in which are freely rotatable a rock-shaft 14 rotated thru the medium of a handle 16. Each of these rock-shafts carries a pair of upstanding tubular compensating levers 17 having a sliding pin 18 provided with a ball head 19 which enters a socket formed in a lock bar 21. This lock bar slides in a casting 22, which casting has a U shaped slot 23 adapted to position a bar 24 suspended beneath the dump body 26. It is understood that there are two of these bars 24 upon the dump body, (see Fig. 2). At 27 I have shown a pair of bearings which support locking pins 28. These locking pins enter castings 29 supported upon the rear portion of the body supporting frame, which casting have slots 31 therein, and are similar to the castings 22 mounted upon the sides of the frame. The slots 31 are adapted to receive a rod 32 suspended from the truck body and parallel to the rear thereof, (see Figs. 1 and 2). Suspended between and beneath the parallel members 7 and 8 are hydraulic cylinders 33 and 34 carried in a cross shaft 36 having bearings 37 and 38 secured to the under side of the parallel members 7 and 9 respectively. These cylinders each carry a piston 39 connected to a piston rod 41, the upper end of which is pivoted to a yoke 42 with a universal movement, which yoke supports a pivoted arm 43 having a pin 44 which connects to a yoke 46 straddling the yoke 42. This yoke 46 is connected to the dump body 26. A pull rod 47 is actuated by a lever 48 and has a rod having diverging arms 49 and 51 which arms are connected to the locking bolts 28.

The operation of my device is as follows:—

Figure 2:
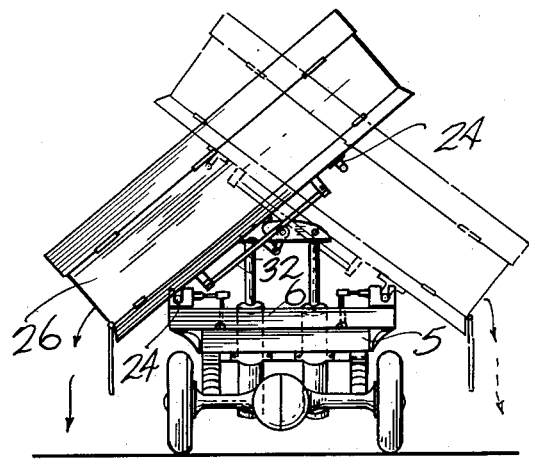
Figure 3:
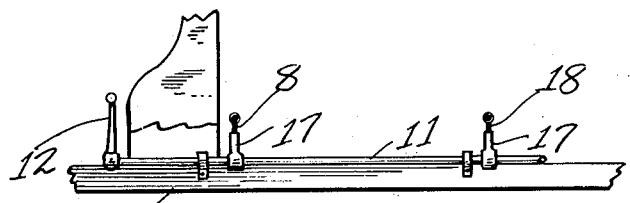

Assuming that the dump body is in lowered position, that is, parallel to the supporting frame 6, and loaded with material, the levers 12, 48 and 16 will be moved to such a position that the locking bolts 21 and 28 will overlie the bars 24 and 32, thus the body will be held to the frame against tipping in any direction. Now assuming that it is desired to dump the body and empty the material therein to the rear of the vehicle as shown in Fig. 1, the levers 12 and 16 will be rotated so as to impart rotary movement to the rock-shafts 11 and 14 respectively, and to thus withdraw the locking pins 21, thus permitting the supporting rod 24 to leave the slots 23. By now actuating the hydraulic jacks in the usual manner, the body will be moved upwardly and the material therein will be dumped to the rear of the vehicle. Assuming now that it is desired to dump the material to one side of the vehicle as illustrated in Fig. 2, in this case, the lever 48 will be moved so as to pull the rod 47, arms 49 and 51, and consequently pull the bolts 28 so that the supporting rod 32 may move upwardly out of the slots 31. The lever 12 will also be actuated so as to pull the bolt 21 upon the non-dump side after which actuation of the hydraulic jacks will cause the vehicle body to tip to the side, the supporting rod 24 upon the dumping side acting as the fulcrum in the same manner that the rod 32 acted as a fulcrum when dumping to the rear. It will thus be seen, that by actuating the three levers 12, 16 and 48 in the proper order that the body may be dumped in any desired direction.

From the foregoing description, considered in connection with the accompanying drawings it will be obvious that I have devised a three-way hydraulic dump truck which will eliminate the necessity of the maneuvering actions ordinarily required with the conventional trucks when it is desired to dump the load. Further by the convenient method employed of being able to quickly and easily dump the load there is a saving of time, labor and fuel, as compared to the present-type of dump truck.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the class described, a frame adapted to support a vehicle body, a plurality of supporting rods suspended from said vehicle body, a plurality of rod receiving castings positioned in pairs on said frame, slots formed in said castings to receive the supporting rods, bolts slidable through said castings and adapted to overlie said rods and having socket members formed on their free ends, and means for independently actuating said bolts in pairs comprising lever-actuated rock-shafts having upright compensating levers consisting of telescopic elements, certain of which elements are provided with ball members adapted to engage the sockets formed in said bolts.

FRANK SMITH.